(12) United States Patent
Kinpara et al.

(10) Patent No.: US 6,954,063 B2
(45) Date of Patent: Oct. 11, 2005

(54) MOTION DETECTING DEVICE USING MAGNETORESISTIVE UNIT

(75) Inventors: Takamasa Kinpara, Kariya (JP); Hirofumi Uenoyama, Nishikasugai-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/101,834

(22) Filed: Mar. 21, 2002

(65) Prior Publication Data

US 2002/0140420 A1 Oct. 3, 2002

(30) Foreign Application Priority Data

Mar. 27, 2001 (JP) ........................................ 2001-090983
Feb. 27, 2002 (JP) ........................................ 2002-051448

(51) Int. Cl.$^7$ ................................................ G01B 7/30
(52) U.S. Cl. ............................ 324/207.21; 324/207.25; 324/207.12; 324/174
(58) Field of Search ...................... 324/207.21, 207.25, 324/207.24, 235, 207.12, 174; 338/32 R

(56) References Cited

U.S. PATENT DOCUMENTS

| | | | | |
|---|---|---|---|---|
| 4,401,944 A | * | 8/1983 | Narimatsu et al. | 324/207.21 |
| 5,359,287 A | * | 10/1994 | Watanabe et al. | 324/207.21 |
| 5,656,936 A | * | 8/1997 | Ao et al. | 324/207.21 |
| 6,020,736 A | * | 2/2000 | Aoyama et al. | 324/207.21 |
| 6,104,186 A | | 8/2000 | Yamada et al. | |
| 6,111,403 A | * | 8/2000 | Yokotani et al. | 324/207.21 |
| 6,339,324 B1 | * | 1/2002 | Sakanoue et al. | 324/174 |
| 6,452,381 B1 | * | 9/2002 | Nakatani et al. | 324/207.21 |
| 6,496,002 B1 | * | 12/2002 | Kogiso et al. | 324/207.21 |
| 6,559,638 B1 | * | 5/2003 | Adelerhof | 324/207.21 |
| 6,570,376 B2 | * | 5/2003 | Matsui et al. | 324/207.21 |

FOREIGN PATENT DOCUMENTS

| | | |
|---|---|---|
| DE | 19854890 | 6/1999 |
| JP | B2-58-56408 | 12/1983 |
| JP | A-60-155917 | 8/1985 |
| JP | A-63-205515 | 8/1988 |
| JP | B2-1-40510 | 8/1989 |
| JP | B2-2-11022 | 3/1990 |
| JP | 09-229614 | 9/1997 |

* cited by examiner

*Primary Examiner*—Jay Patidar
(74) *Attorney, Agent, or Firm*—Posz Law Group, PLC

(57) ABSTRACT

A rotation detecting device includes a magnetoresistive unit comprising a pair of magnetoresistive sensing elements arranged in line symmetry, and a biasing magnet that generates magnetic flux. The magnetoresistive unit is arranged so that its line of symmetry extends in the direction of the magnetic flux generated by the biasing magnet. As a result, an output of the magnetoresistive unit does not change when the magnetic flux passes along the line of symmetry whether operating in a high temperature condition or a room temperature condition. By setting the threshold level to this output voltage, the output of the magnetoresistive unit can be shaped into a pulse signal without changing it in correspondence with temperatures.

16 Claims, 3 Drawing Sheets

FIG. 1A
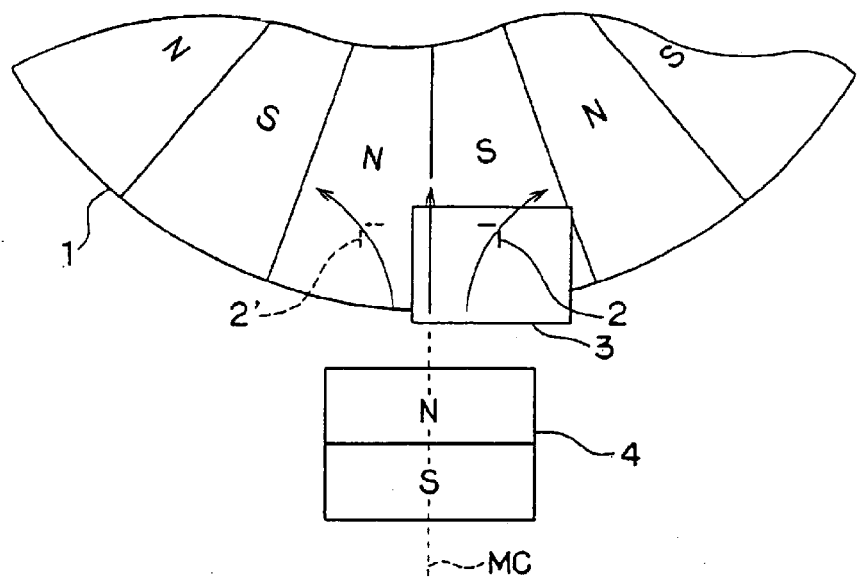
FIG. 2B
FIG. 1B
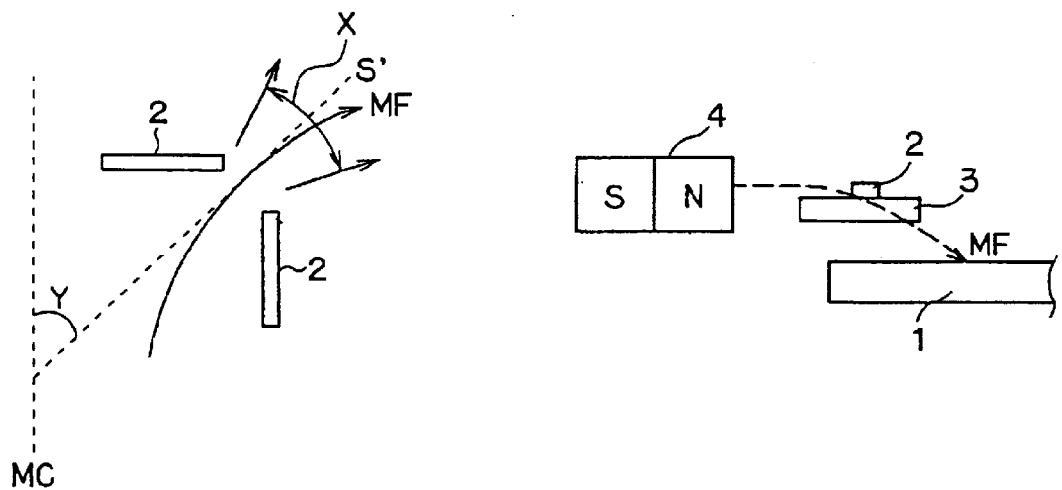
FIG. 2A
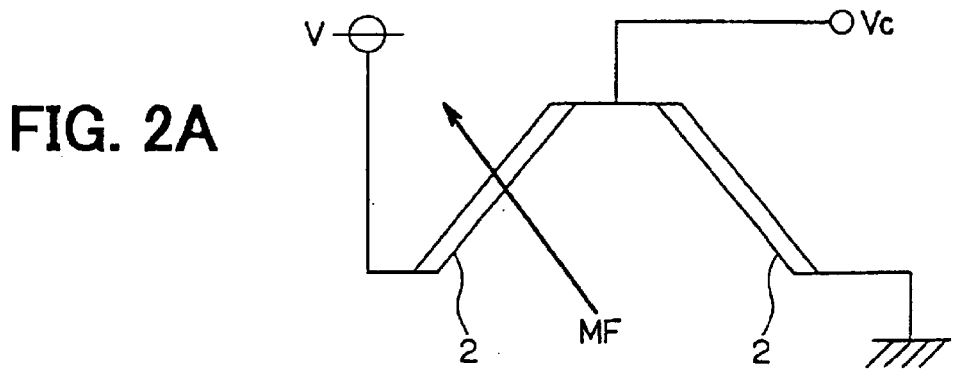

MOTION DETECTING DEVICE USING MAGNETORESISTIVE UNIT

CROSS REFERENCE TO RELATED APPLICATION

This application is based on and incorporates herein by reference Japanese Patent Applications No. 2001-90983 filed Mar. 27, 2001 and No. 2002-51448 filed Feb. 27, 2002.

FIELD OF THE INVENTION

The present invention relates to a motion detecting device using a magnetoresistive unit, which can be used as a rotation detecting device such as a wheel speed sensor.

BACKGROUND OF THE INVENTION

Some motion detecting devices use a pair of sensing elements as a magnetoresistive unit, as disclosed in U.S. Pat. No. 5,359,287, to detect rotation of a disk-shaped magnetized rotor in response to the magnetism generated from a biasing magnet disposed to face the magnetized rotor. The sensing elements are arranged to be inclined 45° relative to a line of symmetry that corresponds to a radial center line of the magnetized rotor. This line corresponds to the magnetic center of the biasing magnet. According to this arrangement, the magnetic flux generated by the biasing magnet and passing through the magnetoresistive unit deflects on a plane parallel with the side circular plane of the magnetized rotor, when the magnetized rotor rotates. This deflection is used to detect rotation of the rotor.

It sometimes becomes necessary to change the arrangement of the magnetoresistive unit relative to the biasing magnet for improving performance of the device. If the magnetoresistive unit is displaced sidewise in parallel so that the line of symmetry of the magnetoresistive unit is parallel with the radial center line passing through the magnetic center of the biasing magnet and the center of rotation of the magnetized rotor, the output of the magnetoresistive unit changes largely in correspondence with temperatures under which the magnetoresistive unit operates. This large temperature dependent characteristics of the magnetoresistive unit requires different threshold levels for respective temperatures in shaping or digitizing the output signal of the magnetoresistive unit into a pulse signal.

SUMMARY OF THE INVENTION

It is therefore an object of the present invention to provide a motion detecting device, which requires a single threshold level over a wide range of temperatures.

It is another object of the present invention to provide a motion detecting device, which is capable of detecting both the speed and the direction of motion of a moving body.

According to the present invention, a motion detecting device comprises a biasing magnet and a magnetoresistive unit.

The biasing magnet generates magnetic flux which passes to a movable body, and the magnetoresistive unit is disposed between the movable body and the biasing magnet for generating an electric output varying with a motion of the movable body. The magnetoresistive unit is placed at a position away from a line of magnetic center of the biasing magnet. Further, the magnetoresistive unit is inclined from the line of magnetic center of the biasing magnet in a direction of the magnetic flux.

The magnetoresistive unit is provided at each side of the magnetic center of the biasing magnet in line symmetry of the magnetic center, when the direction of movement of the movable body is detected.

BRIEF DESCRIPTION OF THE DRAWINGS

The above and other objects, features and advantages of the present invention will become more apparent from the following detailed description made with reference to the accompanying drawings. In the drawings:

FIG. 1A is a schematic plan view showing a motion detecting device according to a first embodiment of the present invention;

FIG. 1B is a schematic side view showing the motion detecting device shown in FIG. 1A;

FIG. 2A is a schematic view showing a relation between the magnetic flux and a magnetoresistive unit;

FIG. 2B is a schematic view showing a deflection angle of magnetic flux at the magnetoresistive unit;

DETAILED DESCRIPTION OF THE PREFERRED EMBODIMENTS

First Embodiment

Figure 3:
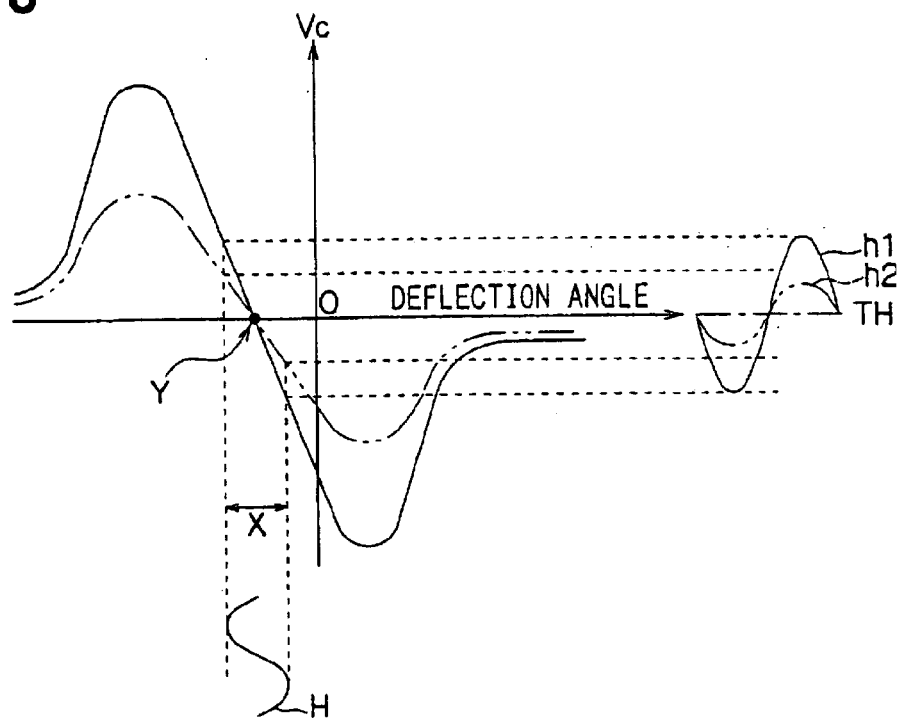
FIG. 3 is a graph showing a relation between the angle of deflection of the magnetic flux and the output signal of the magnetoresistive unit in the first embodiment.

Referring first to FIGS. 1A and 1B, a motion detecting device is for detecting a motion of a movable body such as a wheel of a vehicle. In this first embodiment, a magnetized rotor 1 is attached to the wheel. The magnetized rotor 1 is alternately magnetized to the north pole (N) and the south pole (S) at a fixed angular interval in the circumferential direction.

The motion detecting device comprises a magnetoresistive unit 2 including a pair of magnetoresistive sensing elements formed on a sensor chip 3, and a biasing magnet 4 that generates magnetic flux MF. The magnetoresistive unit 2 is formed on one side surface of the sensor chip 3. The sensor chip 3 is shaped generally in a cuboid and placed so that its side surface formed with the magnetoresistive unit 2 is in parallel with the side circular surface of the magnetized rotor 1. The magnetoresistive unit 2 is placed on the right side of the magnetic center MC of the biasing magnet 4.

The biasing magnet 4 is shaped generally in a cuboid or cylinder, and magnetized to the north pole (N) and the south pole (S) in the axial direction. The biasing magnet 4 is placed so that its line of magnetic center MC corresponds to an imaginary radial line extending from the center of rotation of the magnetized rotor 1 in the radial direction. The biasing magnet 4 is placed so that the magnetic flux MF generated by the biasing magnet 4 passes to the top side circular plane surface of the magnetized rotor 1 in a parabolic form through the magnetoresistive unit 2.

In this first embodiment, the sensor chip 3 having the magnetoresistive unit 2 is placed above the magnetized rotor 1 as shown in FIG. 1B to shorten the distance between the magnetized rotor 1 and the biasing magnet 4 in the radial direction of the magnetized rotor 1. However, it is possible to place the sensor chip 3 having the magnetoresistive unit 2 on the same plane as the magnetized rotor 1 and the biasing magnet 4 between the magnetized rotor 1 and the biasing magnet 4.

The biasing magnet 4 generates the magnetic flux MF, which is deflected by the magnetic poles of the magnetized rotor 1. Each magnetoresistive sensing element of the magnetoresistive unit 2 changes electric resistances in correspondence with the direction of the magnetic flux MF generated from the biasing magnet 4 and passing therethrough. As the direction of the magnetic flux MF passing from the biasing magnet 4 to the magnetic poles of the magnetized rotor 1 is deflected in response to rotation of the magnetic poles of the magnetized rotor 1, the rotation of the magnetized rotor 1 can be detected from the electric resistances of the magnetoresistive unit 2.

In practice, as shown in FIG. 2A, the magnetoresistive sensing elements are connected in series and the resistance of the magnetoresistive unit 2 is detected as an electric output voltage Vc developed at the junction between the magnetoresistive sensing elements.

Specifically, as shown in FIG. 2B in detail, the sensing elements of the magnetoresistive unit 2 are arranged in line symmetry with respect to the line of symmetry S', which is inclined from the line of magnetic center MC by an angle Y. The line of magnetic center MC extends in the direction of magnetic flux MF generated by the biasing magnet 4 at the center of the biasing magnet 4, and corresponds to an imaginary line extending from the axis of rotation of the magnetized rotor 1 in the radial direction. The line of symmetry S' generally corresponds to the magnetic flux MF passing through the center of the magnetoresistive unit 2. As the magnetic flux MF passing through the magnetoresistive unit 2 is directed away from the magnet center MC as the position of the magnetoresistive unit 2 is away from the magnetic center MC, the angle Y is increased as the magnetoresistive unit 2 is displaced from the magnetic center MC. That is, the line of symmetry S' is tangential to the magnetic flux MF passing thereat. This is determined under the condition that no magnetized rotor exists.

Thus, the magnetic flux MF deflects over an angle X around the line of symmetry S', when the north pole (N) and the south pole (S) pass by the magnetoresistive unit 2 due to rotation of the rotor 1. It is noted that the line of symmetry S' coincides with the center of the magnetic deflection angle X. According to this arrangement, when the magnetic poles of the magnetized rotor 1 alternately pass by the magnetoresistive unit 2, the magnetic field changes in the perpendicular direction relative to the surfaces of the magnetoresistive unit 2.

According to this first embodiment, as shown in FIG. 3, the output voltage Vc of the magnetoresistive unit 2 changes in relation to the magnetic deflection angle. In FIG. 3, the solid line indicates characteristics under room temperature and the dot-and-chain line indicates characteristics under high temperature. Still further, the output signal Vc is shown taking the magnetic center MC of the biasing magnet 4 as the center of the magnetic deflection angle (0). Thus, the reference point (0) in FIG. 3 is different from the center of the magnetic deflection angle shown in FIG. 2B.

As understood from FIG. 3, the output voltage Vc changes less in the high temperature condition than in the room (low) temperature condition, and changes symmetrically with respect to a point which is shifted from the reference point by the angle Y. At this point, the temperature dependent characteristics (output difference) of the output voltage Vc is zero.

As the magnetoresistive unit 2 is not in line symmetry with respect to the line of magnetic center MC of the biasing magnet 4 but is in line symmetry with respect to the line S' which is inclined from the line of magnetic center MC, the magnetic flux MF that is applied to the magnetoresistive unit 2 is shown as an input waveform H in FIG. 3. As a result, the output voltage Vc changes as shown by h1 and h2 in the room temperature condition and in the high temperature condition, respectively. By setting the threshold level TH for shaping or digitizing the output voltage Vc into a pulse signal to a level where the voltage levels of waveforms h1 and h2 are equal, that is, where the waveforms h1 and h2 cross, the output voltage Vc can be shaped into the pulse signal irrespective of the temperature dependent output characteristics of the magnetoresistive unit 2.

Figure 4:
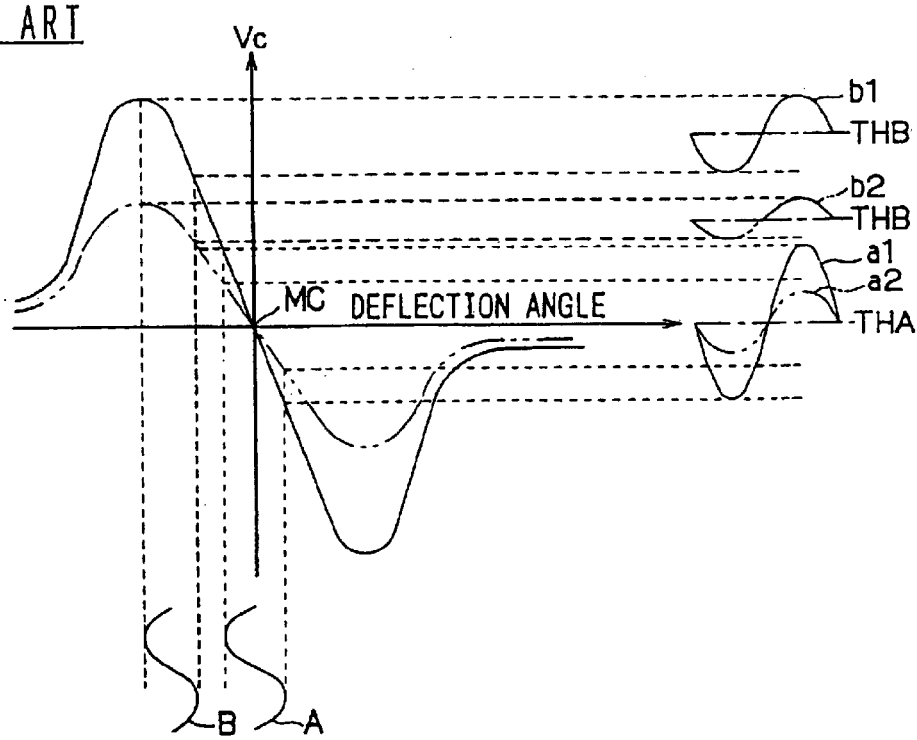
FIG. 4 is a graph showing a relation between the angle of deflection of the magnetic flux and the output signal of the magnetoresistive unit according to a related art.

FIG. 4 shows a comparative output characteristics of a magnetoresistive unit 2 in the case of related art, in which the magnetoresistive unit 2 is displaced sidewise from the biasing magnet 4. That is, the magnetoresistive unit 2 is placed in such a manner that the line of symmetry S' of the magnetoresistive unit 2 is parallel with the line of magnetic center MC. In this instance, the magnetic flux MF input to the magnetoresistive unit 2 changes as shown by waveform A. As a result, the output voltage Vc changes as shown by waveforms a1 and a2 in the room temperature condition and the high temperature condition, respectively. In this instance, the output voltage vc of the magnetoresistive unit 2 can be shaped into a pulse signal with a single threshold level THA irrespective of temperatures.

If the magnetoresistive unit 2 is not placed in line symmetry with the line of magnetic center MC, that is, the line of symmetry S' of the magnetoresistive unit 2 does not coincide with the line of magnetic center MC, however, the magnetic flux MF input to the magnetoresistive unit 2 changes as shown by waveform B. As a result, the output voltage Vc changes as shown by waveforms b1 and b2 in the room temperature condition and the high temperature condition, respectively. In this instance, the threshold level THB for shaping the output voltage Vc of the magnetoresistive unit 2 into a pulse signal must be set separately to different levels depending on temperatures.

Second Embodiment

In the second embodiment, as shown in FIG. 1A, another magnetoresistive unit 2' is placed on the left side of the magnetic center MC of the biasing magnet 4. The magnetoresistive unit 2' is arranged in line symmetry with the magnetoresistive unit 2. The magnetoresistive units 2 and 2' produce respective output voltages Vc and Vc' which are different in phase. That is, the output voltage Vc of the magnetoresistive unit 2 is advanced or retarded relative to the output voltage Vc' of the magnetoresistive unit 2' depending on the direction of rotation of the magnetized rotor 1. Therefore, in this second embodiment, the output voltages Vc and Vc' of the magnetoresistive units 2 and 2+ are used to detect the direction of rotation of the magnetized rotor 1 in a manner shown in FIGS. 5 and 6.

Figure 5:
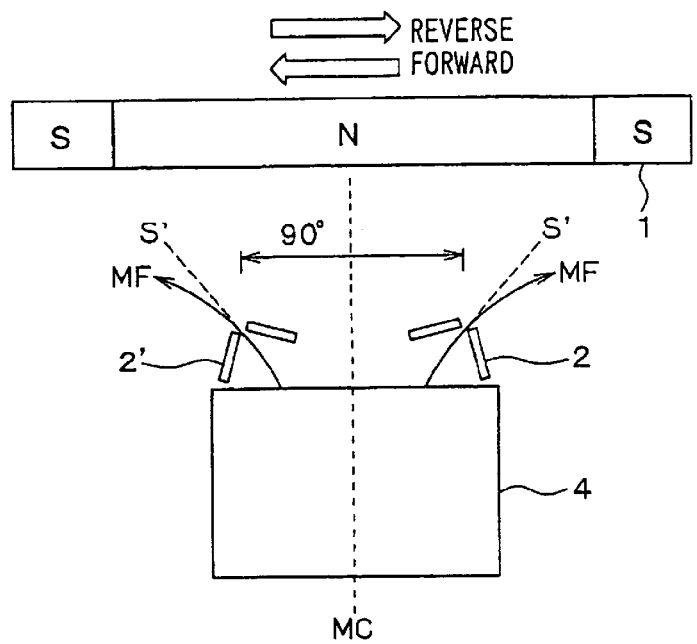
FIG. 5 is a schematic view showing a motion detecting device according to a second embodiment of the present invention.
Figure 6:
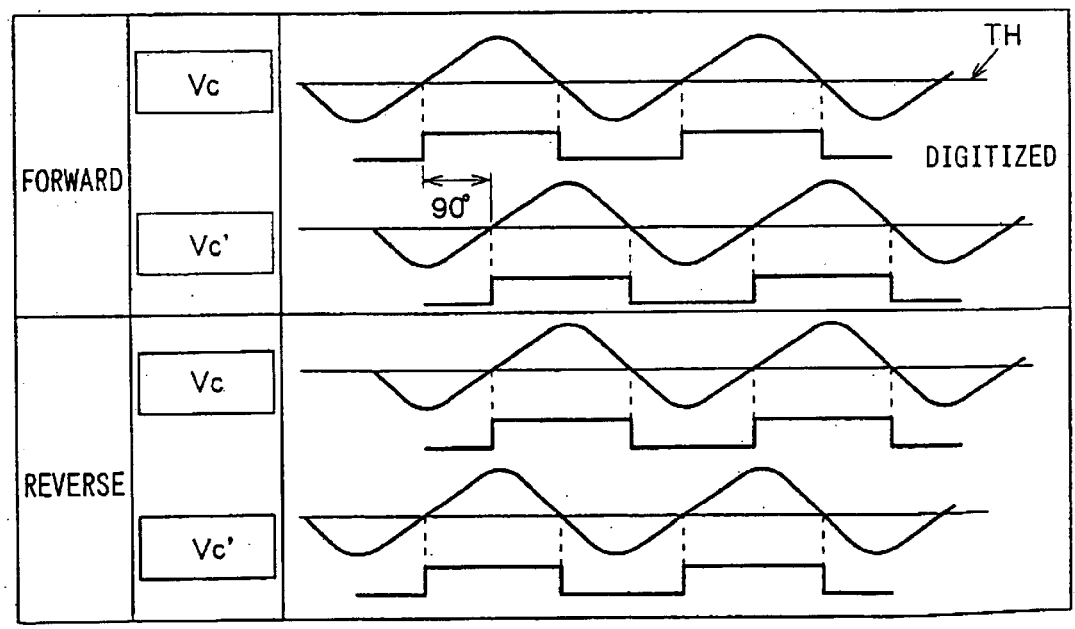
FIG. 6 is a signal diagram showing the output signal of the magnetoresistive unit in the second embodiment.

As shown in FIG. 5, the magnetoresistive units 2 and 2' are displaced from the magnetic center MC so that the output voltages Vc and Vc' have phase angle difference of 90° therebetween. If the magnetized rotor 1 rotates in the forward direction in FIG. 5 (clockwise direction in FIG. 1A), the output voltage Vc advances 90° from the output voltage Vc'. If the magnetized rotor 1 rotates in the reverse direction in FIG. 5 (counter-clockwise direction in FIG. 1A), on the other hand, the output voltage Vc retards 90° from the output voltage Vc'. The output voltages Vc and Vc' are digitized into respective pulse signals by comparing with the threshold TH in a manner similar to the first embodiment shown in FIG. 3. The direction of rotation of the magnetized rotor 1 can be detected by detecting which one of a rising of a falling edge of the pulse signals appears first.

The present invention should not be limited to the disclosed embodiments, but may be modified in various ways. For instance, the phase difference between the output voltages of the magnetoresistive units may be other than 90°. Two or more magnetoresistive units may be provided on the right or left side of the magnetic center of the biasing magnet. Two sensing elements of each magnetoresistive unit may be arranged to form other than 90° therebetween. The magnetoresistive unit may have only one sensing element as long as the sensing element is inclined from the magnetic center of the biasing magnet. The rotor may be a non-magnetized toothed rotor.

What is claimed is:

1. A motion detecting device for a movable body comprising:
    a biasing magnet for generating magnetic flux which passes to the movable body; and
    a magnetoresistive unit disposed between the movable body and the biasing magnet for generating an electric output varying with a motion of the movable body,
    wherein
    the magnetoresistive unit is placed at a position away from a line of magnetic center of the biasing magnet,
    the magnetoresistive unit is inclined from the line of magnetic center of the biasing magnet in a direction of the magnetic flux,
    the magnetoresistive unit has a pair of magnetoresistive sensing elements arranged in line symmetry,
    a line of symmetry of the sensing elements is inclined from the line of magnetic center of the biasing magnet,
    the magnetoresistive sensing elements are formed on a sensor chip having a side surface that is parallel with a side plane surface of the movable body, and
    the magnetoresistive sensing elements are placed at a different elevation than the movable body, and the movable body is a magnetized rotor that faces the side surface of the sensor chip that is opposite a surface for the magnetoresistive sensing elements.

2. The motion detecting device as in claim 1, wherein the magnetic flux deflects over an angle at the magnetoresistive unit in response to the motion of the movable body, and wherein a center of the angle is in line with the line of symmetry of the sensing elements.

3. The motion detecting device as in claim 1, wherein the magnetoresistive unit is inclined in line with a tangential line of the magnetic flux passing thereat.

4. The motion detecting device as claim 1, wherein the line of symmetry of the sensing elements is identical with a tangential line of the magnetic flux passing thereat.

5. The motion detecting device as in claim 1, wherein the magnetoresistive unit is disposed to face a plane in which the movable body moves.

6. The motion detecting device as in claim 1, wherein the movable body is a vehicle wheel.

7. The motion detecting device as in claim 1, wherein the sensor chip has a substantially cuboid shape.

8. The motion detecting device as in claim 1, wherein the magnetic flux generated by the biasing magnet passes to the side plane surface of the magnetized rotor in a parabolic form through the magnetoresistive unit.

9. The motion detecting device as in claim 1, wherein:
    the magnetoresistive sensing elements are connected in series and the resistance of the magnetoresistive unit is detected as an electric output voltage Vc developed at a junction of the magnetoresistive sensing elements.

10. The motion detecting device as in claim 9, wherein the output voltage Vc of the magnetoresistive unit changes in correspondence with a magnetic deflection angle.

11. The motion detecting device as in claim 9, wherein the output voltage Vc changes less in a high temperature condition than in a low temperature condition.

12. A motion detecting device for a movable body comprising:
    a biasing magnet for generating magnetic flux which passes to the movable body;
    a first magnetoresistive unit disposed between the movable body and the biasing magnet for generating an electric output varying with a motion of the movable body; and
    a second magnetoresistive unit placed on a side of the magnetic center of the biasing magnet,
    wherein
    the first and second magnetoresistive units are each placed at a position away from a line of magnetic center of the biasing magnet, are each inclined from the line of magnetic center of the biasing magnet in a direction of the magnetic flux, and each have a pair of magnetoresistive sensing elements arranged in a line of symmetry that is inclined from the line of magnetic center of the biasing magnet, and
    the magnetoresistive sensing elements are formed on a sensor chip having a side surface that is parallel with a side plane surface of the movable body.

13. The motion detecting device of claim 12, wherein the second magnetoresistive unit is arranged in line symmetry with the first magnetoresistive unit.

14. The motion detecting device as in claim 13, wherein the first magnetoresistive unit and the second magnetoresistive unit produce output voltages Vc and Vc', respectively, which are different in phase.

15. The motion detecting device as in claim 14, wherein the output voltages Vc and Ve' are used to detect the direction of rotation of the movable body.

16. A motion detecting device for a movable body comprising:
    a biasing magnet for generating magnetic flux which passes to the movable body;
    a magnetoresistive unit disposed between the movable body and the biasing magnet for generating an electric output varying with a motion of the movable body, the magnetoresistive unit placed at a position away from a line of magnetic center of the biasing magnet,
    wherein the magnetoresistive unit is inclined from the line of magnetic center of the biasing magnet in a direction of the magnetic flux, has a pair of magnetoresistive sensing elements arranged in a line symmetry that is inclined from the line of magnetic center of the biasing magnet, and is formed on a sensor chip having a side surface that is parallel with a side plane surface of the movable body; and
    another magnetoresistive unit disposed between the movable body and the biasing magnet for generating another electric output varying with the motion of the movable body, the another magnetoresistive unit being placed at another position away from the line of magnetic center of the biasing magnet and arranged in line symmetry with the magnetoresistive unit, wherein
    the another magnetoresistive unit is inclined from the line of magnetic center of the biasing magnet in the direction of the magnetic flux, has a pair of magnetoresistive sensing elements arranged in a line symmetry that is inclined from the line of magnetic center of the biasing magnet, and is formed on another sensor chip having a side surface that is parallel with the side plane surface of the movable body.

* * * * *